(12) United States Patent
Petzold et al.

(10) Patent No.: US 7,302,338 B2
(45) Date of Patent: Nov. 27, 2007

(54) NAVIGATIONAL SYSTEM AND METHOD FOR CONFIGURING A NAVIGATIONAL SYSTEM

(75) Inventors: Bernd Petzold, Wunstorf (DE); Cornelis Hahlweg, Hildesheim (DE); Ulrich Kersken, Dieholzen (DE); Gerd Draeger, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 1185 days.

(21) Appl. No.: 10/182,875

(22) PCT Filed: Jan. 19, 2001

(86) PCT No.: PCT/DE01/00210

§ 371 (c)(1),
(2), (4) Date: Dec. 2, 2002

(87) PCT Pub. No.: WO01/57476

PCT Pub. Date: Aug. 9, 2001

(65) Prior Publication Data

US 2004/0015291 A1    Jan. 22, 2004

(30) Foreign Application Priority Data

Feb. 4, 2000    (DE) ............................... 100 04 967

(51) Int. Cl.
*B60K 28/02* (2006.01)
(52) U.S. Cl. ........................................ 701/200; 342/46
(58) Field of Classification Search ................ 701/200, 701/49, 58, 51, 55, 56, 59, 61; 342/46, 420, 342/454
See application file for complete search history.

(56) References Cited

U.S. PATENT DOCUMENTS

| 4,829,434 | A | * | 5/1989 | Karmel et al. ................. 701/59 |
| 5,089,963 | A | * | 2/1992 | Takahashi ..................... 706/23 |
| 5,247,859 | A | * | 9/1993 | Agusa et al. ................. 477/129 |
| 5,282,401 | A | * | 2/1994 | Hebbale et al. ............. 475/123 |
| 6,253,139 | B1 | * | 6/2001 | Borodani et al. ............. 701/55 |
| 6,317,666 | B1 | * | 11/2001 | List et al. ..................... 701/29 |
| 6,349,257 | B1 | * | 2/2002 | Liu et al. ..................... 701/200 |
| 6,449,572 | B1 | * | 9/2002 | Kurz et al. ................... 702/94 |

FOREIGN PATENT DOCUMENTS

| DE | 4429121 | 2/1996 |
| DE | 197 53 172 | 7/1998 |
| DE | 19821803 | 11/1999 |
| DE | 0 967 460 | 12/1999 |
| EP | 0 803 705 | 10/1997 |
| JP | 10281784 | 10/1998 |

* cited by examiner

*Primary Examiner*—Dalena Tran
(74) *Attorney, Agent, or Firm*—Kenyon & Kenyon LLP

(57) ABSTRACT

In a navigational system for generating route recommendations and for target tracking, a system (500, 800) is proposed, which detects vehicle-, traffic-, and/or driver-related data and which from these data can derive patterns of behavior of the user. The patterns of behavior as well as the user preferences derived therefrom can then be used to apply individually adapted optimization criteria to the specific user in calculating the route.

When patterns of behavior are detected that deviate from the usual behavior, the detection of sensor information can automatically be expanded in order, in a plausibility check, to establish causes for the deviations and to derive therefrom new user preferences, if appropriate.

2 Claims, 2 Drawing Sheets

NAVIGATIONAL SYSTEM AND METHOD FOR CONFIGURING A NAVIGATIONAL SYSTEM

FIELD OF THE INVENTION

The present invention relates to a method for configuring a navigational system, as well as to a navigational system that can suggest at least one recommended route on the basis of predetermined behavior patterns of the user and on the basis of user preferences.

BACKGROUND INFORMATION

Navigational systems for supporting a traffic participant, such as especially an automobile driver, are conventional, and they are generally composed of the subsystems: (a) digital road map, (b) computing module for calculating the driving route, (c) position determining system, (d) system management, (e) sensors for detecting vehicle motions, (f) input unit, and (g) output unit for operational control and target tracking. The route is calculated generally on the basis of various optimization parameters, which must be set previously by the user, or which are already fixedly established by the manufacturer in the algorithms for the route calculation. The optimization is carried out with the assistance of evaluations of the participating route elements contained in a database, which can include, for example, length, possible speed, type of road, and the like. The selection of an optimal route can entail, for example, establishing the quickest or the shortest route. The particular weighting that is undertaken here can be influenced by the personal preferences of the user.

Optimization that is preestablished by the manufacturer is usually parametrized to an "average driver" and therefore produces an optimal route only for a driver of that type. However, generally different drivers evaluate route recommendations differently. For example, specific road types are preferred or avoided, or the average speed on expressways varies depending on the type of vehicle, driver temperament, or the like. Taking into account this individual driver behavior or other preferences in the selection of the route (for example, preferring routes that have more beautiful landscapes) is accomplished at present largely by a manual input of predetermined parameters, which can generally only happen when the vehicle is standing still. This reduces the clarity and the ease of operation of the navigational system especially as the number of parameters rises, so that an appropriately calculated modification of all relevant parameters can only be expected from experienced or technically aware users.

SUMMARY

An objective of the present invention is to make available a navigational system and a method for configuring a navigational system of this type, which would make it possible to individually adjust user preferences, without, as a result, burdening the user with cumbersome inputting procedures.

In an example method for configuring a navigational system according to the present invention, is vehicle, traffic, and/or driver data are recorded by sensors, and individual behavior patterns and user preferences are derived therefrom for the route planning. Accordingly, a configuring method of this type operates completely automatically on the basis of information that is recorded by sensors, and the user of the navigational system is not himself burdened with configuring the system. The term 'patterns of behavior', in this context, represents situation-specific regularities in the behavior of the driver, that are narrowly limited with regard to behavior, for example, avoiding local thoroughfares of larger cities, preferring expressways, or the like. In the method according to the present invention, these types of significant patterns of behavior of the user are recorded automatically through data analysis and data statistics. The same applies to user preferences, which on a higher level describe the partialities of the user or the weighting of optimization criteria by the user of the navigational system. In general, there exists a connection between patterns of behavior and user preferences, such that the user preferences combine and abstract commonalties that are contained in various patterns of behavior. The patterns of behavior derived using the sensors therefore describe the typical user preferences in current or expected driving situations, and they can be made available to the navigational system for a route calculation and target tracking that are oriented specifically to the preferences of the user. In this context, the individual situation-specific user preferences may be stored as explicit statistics in the database of the system and can be modified independently of each other.

The patterns of behavior and/or the user preferences that are derived from the sensor data, can be compared with the patterns of behavior and/or user preferences that are preestablished in the navigational system for the route planning. As a result of the comparison, it can be established whether the profile of user preferences that is active in the navigational system is still correct, or whether such large deviations exist that a change in the profile is necessary. A change of this type can either be carried out so as to result in a completely new user profile that is generated on the basis of the sensor data, or from a quantity of user profiles that have been preestablished in the navigational system the most appropriate profile can be selected. Examples for user preferences that can be automatically generated or preestablished by the manufacturer are:

preferred road classes (expressway, local roads, city streets)

preferred road surroundings (for example, avoiding intersecting streets)

driving velocity as related to road classes, assuming unhindered traffic route selection in response to traffic disruptions stopping behavior of the driver (how long, how often, etc.)

route following in response to preestablished optimization strategies (for example, the quickest route)

preferred means of transportation in intermodal route planning (i.e., route planning using different means of locomotion, such as automobile, train, local transportation systems, etc.).

In one refinement of the present invention, deviations of the user from the recommended route proposed by the navigational system can be recorded and used for adjusting the patterns of behavior and user preferences. A system of this type is accordingly characterized by the fact that, in the course of the driver's use, it learns or adjusts itself to him. This adjustment takes place automatically, without burdening the user with cumbersome and technically difficult inputs.

In a further refinement of the present invention, the sensors determine changes in the patterns of behavior of the user, and when changes of this type arise, the sensor detection of vehicle, traffic, and/or driver data is changed or expanded, such that the parameters can be determined that most probably have caused the changes in the patterns of behavior. When a behavior of the user is detected that deviates from previous patterns of behavior, a plausibility check is automatically initiated, which by sensor detection of additional parameters, attempts to establish the reason for the current deviation in the pattern of behavior. Examples of significant detection features in a plausibility check of this type are the road class local speed limits the roadway condition, inter alia, described by degree of wetness, wheel grip, roadway surface the visibility conditions, inter alia, described by the intensity of precipitation, density of fog, brightness local traffic situation, inter alia, described by the vehichle's velocity, the velocity, distance, and driving direction of nearby vehicles in the vicinity of the original vehicle time-critical arrival at destination, inter alia, described by absolute time points or time ranges such as deadlines, opening times the purpose of the journey, if appropriate, to be derived from the type of destination, such as business trip, shopping trip, vacation trip traffic and road condition information from official sources.

As soon as parameters of the aforementioned type have been recorded, they can be analyzed to determine those variables that, with a high degree of probability, have caused the deviation in the pattern of behavior can be explained by the fact that the visibility conditions are extraordinarily bad. In this context, a variable is particularly to be considered a cause of the deviation if it has a value lying outside its normal range.

If the variables that are relevant for the deviation of the pattern of behavior have been successfully isolated, then existing patterns of behavior can be adjusted thereto or user-specific and situation-relevant new patterns of behavior can be created. This pattern of behavior can then be recorded in the database of the navigational system so as to be taken into account in future route planning.

In response to changing patterns of behavior in the database of the navigational system, it is possible from time to time to carry out a statistical transformation of the patterns of behavior into user preferences. This can occur especially by minimizing the significant detection features and by largely avoiding local references, in order to be able to apply the user preferences even in areas that are unknown to the user.

The present invention also relates to a navigational system, which can propose at least one route recommendation on the basis of preestablished patterns of behavior of the user and on the basis of user preferences. The navigational system is characterized in that a system for recording and processing vehicle-, traffic-, and driver-related data is coupled to the navigational system, and in that this system makes it possible to carry out a configuration in accordance with a method of the type described above. This means that the system is especially oriented towards processing information that is detected by sensors, from which information individual patterns of behavior and user preferences can be derived. Advantageously, using the system, deviations from the route recommendation can also be detected, so that the navigational system can undertake an adaptation of the user preferences on the basis of these deviations. Furthermore, the system is flexible with respect to the recorded data, so that especially when deviations are established from previous patterns of behavior, the recorded parameters can be expanded such that the parameters that are relevant for the deviation in behavior can be detected, in the sense of a plausibility check.

The navigational system according to the present invention makes possible an automated preparation of user-specific and situation-relevant preferences, which can be used for an individual route planning. In this context, it is especially advantageous that no manual input of the preferences via an input unit is required of the user.

DETAILED DESCRIPTION

Figure 1:
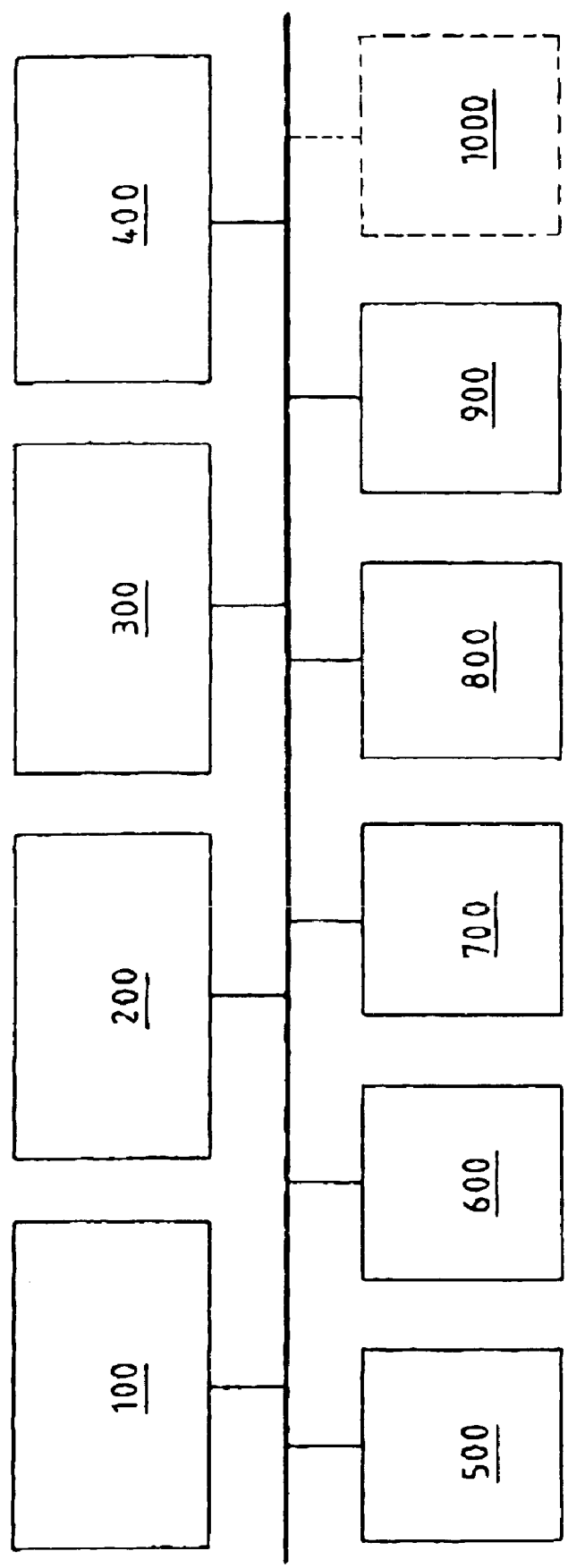
FIG. 1 schematically depicts the components of a navigational system.

In FIG. 1, the components of the navigational system are schematically depicted. The navigational system is composed of the subsystems, digital road map 100, computing module for determining the travel route 400, position determining system 300, system management 200, controllable data-recording sensors 500, input unit 600, output unit 700, and target tracking system 900. A unit 1000 for communicating with other systems can optionally also be present outside of the navigational system.

According to the present invention, the navigational system also contains a device 800 for automatically detecting individual user preferences. Device 800, as depicted, can be a subsystem of the navigational system, but it can also be operated separately from the navigational system using its own data detection sensors and an interface for making available patterns of behavior or user preferences.

Figure 2:
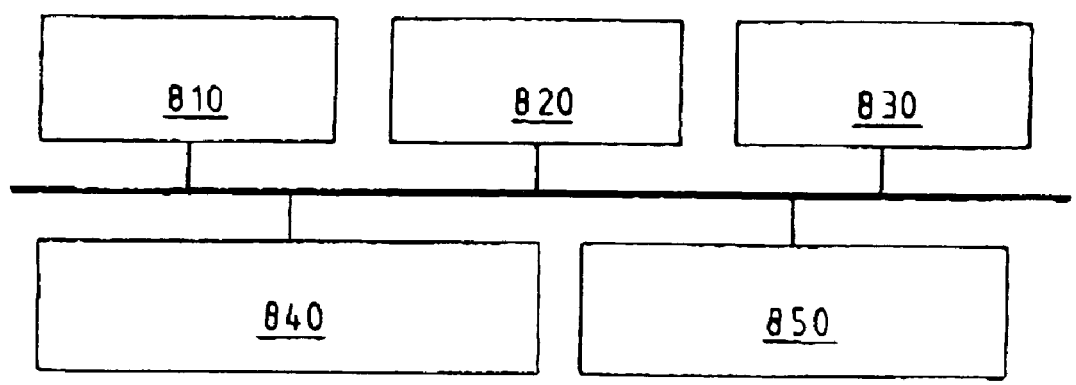
FIG. 2 depicts an example embodiment according to the present invention of the automatic user-profile detection in the navigational system in accordance with FIG. 1.

A more detailed design of device 800 for detecting user profiles is depicted in FIG. 2. Accordingly, this device 800 is made up of a detection unit 820, which controls the data to be recorded by sensors 500 and digital map 100, position determining system 300, travel route determining system 400, and the input unit 600 (for user inputs that are potentially required and context-related), preprocesses, this data (for example, be compressing or deriving variables that are not directly measurable), and finally stores the data in raw database 810.

In unit 830 for data processing, the data from raw database 810 is statistically processed, yielding patterns of behavior. From the latter, user-specific and situation-related user preferences are extracted for detecting user preferences and are made available in database 850 for use in the navigational system. Detection unit 820 can optionally also apply data that have been recorded by another system and were made available via communication unit 1000 to subsystem 800.

Unit 840 is capable of detecting new patterns of behavior on the basis of comparing the features of previously recorded patterns of behavior with the currently detected features, and to automatically generate from the latter new user preferences and to store them in database 850. Alternatively, unit 840 can also check typical user preferences that have been provided by the device manufacture for a typical average driver, on the basis of the recorded current and previous features in database 810, or on the basis of the automatically generated patterns of behavior with respect to their validity for the current user. When significant deviations are ascertained, the active patterns of behavior can be adapted, or a more appropriate one can be selected from a preestablished repertoire of patterns of behavior.

New user preferences are generated, or preestablished user preferences are adapted, only given the sufficient statistical reliability of the data, for which an upper limit can be preestablished. The determination is possible, for example, regarding the frequency of the patterns of behavior.

Figure 3:
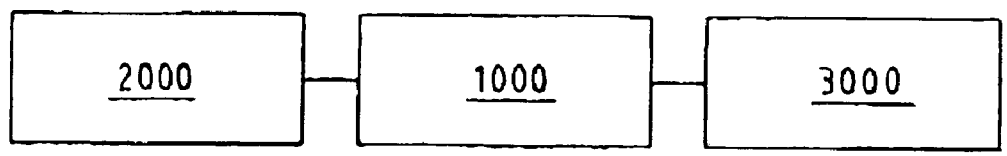
FIG. 3 schematically depicts an entire system for navigation that is modified according to the present invention.

In FIG. 3, an overall system is depicted, in which at least parts of device 800 are arranged self-sufficiently in mobile partial system 2000 or in stationary partial system 3000, systems 2000 and 3000 being connected via a communications unit 1000.

The mode of functioning of the navigational system depicted in the Figures is represented below initially in the example of a situation-dependent driving velocity. Unit 840, on the basis of the normally recorded detection features (for example, velocity, road class), detects that the driver on the expressway is traveling only at 80 km/h instead of the typical driving speed of 130 km/h. The deviation from the typical driving velocity has therefore exceeded a specific limit, it being possible, if appropriate, to preestablish this limit as user-specific. After determining the described situation, detection unit 820 controls sensors 500 such that additional detection features can be recorded and evaluated. These detection features can be, for example, determining the visibility, the road condition, and the local traffic situation. In addition, detection unit 820 via communication unit 1000 can query a data center with respect to additional traffic situation information for the relevant road area. The incoming data are stored in raw database 810 and are supplied to data evaluation unit 830.

In unit 830, the significant detection features are determined that are held to be the cause for the deviation from the typical travel speed detected by unit 840, and that probably describe a new driving situation or a new pattern of behavior. Thus, unit 830 can determine, for example, that the local traffic situation does not influence the vehicle (for example, there are no vehicles traveling a short distance ahead at the same speed), that the road condition is uncritical, but that the visibility is limited by medium-intensity rain. One detection feature is generally isolated by unit 830 as relevant if it has a value that deviates from its standard range, which can be stored in a database.

Unit 840 now compares the current pattern of behavior with any already existing patterns of behavior and derives therefrom, for example, in the present case, a user preference according to the rule, "Given limited visibility as a result of medium to strong rainfall, the driver travels significantly slower on expressways than the typical driving speed." Through the continuing adaptation of the user preferences, this formulated preference can be still further generalized, for example, into the rule, "Given limited visibility, the road-class-typical travel velocity is reduced by 30%."

A further example of the mode of functioning of the system depicted in FIGS. 1 through 3 can be seen in the change of the route selection behavior of the navigational system. The initial situation in this regard is, for example, that unit 840 detects and determines a deviation from the preestablished travel route recommendation, and that there are a plurality of other similar patterns of behavior.

In this case, detection unit 820 therefore drives sensors 500 such that additional detection features, inter alia, can be recorded and evaluated for determining the visibility, the road conditions, and the local traffic situation. In addition, detection unit 820 via communications unit 1000 can query a data center with respect to additional traffic condition information for the relevant road area. In this context, it can be a question of, for example, traffic disturbances that have not yet been taken into account in the travel route in forward segments. The incoming data are stored in raw database 810 and are subsequently supplied to data evaluation unit 830.

In unit 830 for data evaluation, the significant detection features are determined that can be held to be a cause for the deviation, as detected by unit 840, from the preestablished recommendation of the travel route, and that describe a new driving situation or a new pattern of behavior. Thus, unit 830 can determine, for example, that the additional situation-describing detection features do not have any special qualities, but that the driver has selected a local detour.

Unit 840 for detecting user preferences compares this pattern of behavior with patterns of behavior that may already exist, and in this case, it derives therefrom, for example, a user preference in accordance with the rule, "In medium-sized towns, local detours are preferred." The route calculation can then apply this user preference such that the following driving routes always avoid passing through medium-sized towns, even if the route is lengthened overall as a result.

The navigational system according to the present invention therefore permits an automatic detection of individual user preferences without the user of the system having to occupy himself therewith. The system, in the course of use, automatically adjusts itself to the user, so that, for example, a repeated traveling over specific road types at atypical speeds (for example, 80 km/h on expressways and 110 km/h on Federal highways) automatically leads to recommending alternative routes having road classes on which more rapid routes can be determined under the aforementioned preconditions. Furthermore, a repeated, intentional non-following of the original target tracking instructions on a specific route segment in the same way can ultimately lead to recommending a correspondingly corrected driving route.

What is claimed is:

1. A method for configuring a navigational system, comprising:
    detecting, using sensors, at least one of vehicle data, traffic data, and driver data;
    deriving, from the at least one of the vehicle data, traffic data and driver data, at least one of individual patterns of behavior, situation specific patterns of behavior, location-independent patterns of behavior and user preferences;
    comparing the derived at least one of individual patterns of behavior, situation specific patterns of behavior, location independent patterns of behavior, and user preferences, to user preferences that are preestablished for route planning;
    detecting deviations from a route recommendation;
    adjusting the user preferences based on the detected deviations;
    establishing changes in patterns of behavior of the user; and
    when changes in the patterns of behavior of the user arise, one of changing and expanding the detection of the at least one of the vehicle data, traffic data, and driver data such that the parameters are determined that likely caused the changes in the pattern of behavior of the user.

2. A navigational system, comprising:
    sensors configured to detect at least one of vehicle data, traffic data and driver data; and
    a processor configured to
        derive, from the at least one of the vehicle data, traffic data and driver data, at least one of patterns of behavior, situation specific patterns of behavior, location independent patterns of behavior, and user preferences, compare the derived at least one of individual patterns of behavior, situation specific patterns of behavior, location independent patterns of behavior, and user preferences, to user preferences that are preestablished for route planning, one of changing and expanding the detection of the at least one of the vehicle data, traffic data, and driver data such that the parameters are determined that likely caused the changes in the pattern of behavior of the user when changes in the patterns of behavior of the user arise, and determine a recommended route based on the at least one of the patterns of behavior, situation specific patterns of behavior, location independent patterns of behavior, and user preferences.

* * * * *